US008705437B2

(12) United States Patent
Cai

(10) Patent No.: US 8,705,437 B2
(45) Date of Patent: Apr. 22, 2014

(54) PROVIDING NEIGHBOR CELL TRANSMISSION INFORMATION IN A LONG-TERM EVOLUTION SINGLE FREQUENCY NETWORK

(75) Inventor: Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 1784 days.

(21) Appl. No.: 11/744,032

(22) Filed: May 3, 2007

(65) Prior Publication Data

US 2008/0273468 A1 Nov. 6, 2008

(51) Int. Cl.
*H04W 4/00* (2009.01)

(52) U.S. Cl.
USPC .............................. 370/328; 370/338; 370/349

(58) Field of Classification Search
USPC .......................................... 370/328, 338, 348
See application file for complete search history.

(56) References Cited

U.S. PATENT DOCUMENTS

| 2003/0157952 | A1 | 8/2003 | Sarkkinen et al. | |
| 2005/0090278 | A1* | 4/2005 | Jeong et al. | 455/525 |
| 2006/0018269 | A1* | 1/2006 | Agrawal et al. | 370/321 |
| 2006/0068793 | A1* | 3/2006 | Van Lieshout et al. | 455/444 |
| 2007/0260851 | A1* | 11/2007 | Taha et al. | 712/204 |
| 2008/0032731 | A1* | 2/2008 | Shen et al. | 455/522 |

FOREIGN PATENT DOCUMENTS

| EP | 1467586 | A2 | 10/2004 |
| EP | 1708413 | A1 | 10/2006 |

OTHER PUBLICATIONS

Second European Examination Report; EP Application No. 07109017.9; Mar. 23, 2009; 4 pgs.
Siemens; Title: "LTE MBMS"; 3GPP TSG-RAN-WG RAN@ #53; R2-061429; Shanghai, China; May 8-12, 2006; 4 pgs.
PCT Invitation to Pay Additional Fees (Partial EP Search Report); PCT Application No. PCT/US2008/061749; Jul. 25, 2008; 7 pgs.
European Search Report; EP Application No. EP07109017.9; Sep. 17, 2007; 7 pgs.
Siemens, "LTE MBMS"; 3GPP TSG-RAN WG RAN2 #53; Shanghai, China; May 8-12, 2006; 4 pgs.
PCT International Search Report; PCT Application No. PCT/US2008/061749; Nov. 6, 2008; 5 pgs.
PCT Written Opinion of the International Searching Authority; PCT Application No. PCT/US2008/061749; Nov. 6, 2008; 10 pgs.
EP Communication; EP Application No. 07109017.9; Jan. 15, 2010; 4 pages.
Chinese Office Action; Application No. 200880018360.7; May 6, 2013; 11 pages.
Canadian Office Action; Application No. 2,686,862; May 27, 2013; 3 pages.
Chinese Office Action; Application No. 200880018360.7; Oct. 10, 2012; 14 pages.

(Continued)

*Primary Examiner* — Wayne Cai
(74) *Attorney, Agent, or Firm* — J. Robert Brown, Jr.; Maria L. Sekul

(57) ABSTRACT

A system for providing control channel information is provided. The system comprises a processor programmed to promote transmission of a multicast control channel (MCCH). The MCCH includes information related to a service notifying user equipment when transmission on a resource is blocked by one or more cells within a plurality of cells. The MCCH further includes information notifying user equipment when the service is transmitted at less than full power by one or more of the cells of the plurality of cells.

26 Claims, 6 Drawing Sheets

(56) References Cited

OTHER PUBLICATIONS

Extended European Search Report; European Application No. 1116101.8; Apr. 28, 2011; 4 pgs.
Canadian Office Action; Application No. 2,686,862; Nov. 8, 2011; 3 pages.
Chinese Office Action; Application No. 200880018360.7; Dec. 7, 2011; 9 pages.
3GPP TSG RAN WG2 Meeting #57bis; "Definitions Relating to SFN in E-MBMS"; Rx-071527; St. Julian's, Malta; Mar. 26-30, 2007; 2 pages.
3GPP TR 25.813 V7.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects; Release 7; Sep. 2006; 41 pages.
3GPP TR 25.814 V7.1.0; 3rd Generation Partnership Project; Technical Specification Group Radio Access Network; Physical Layer Aspects for Evolved Universal Terrestrial Radio Access (UTRA); Release 7; Sep. 2006; 132 pages.
PCT International Preliminary Report on Patentability; Application No. PCT/US2008/061749; Aug. 11, 2009; 13 pages.

\* cited by examiner

PROVIDING NEIGHBOR CELL TRANSMISSION INFORMATION IN A LONG-TERM EVOLUTION SINGLE FREQUENCY NETWORK

BACKGROUND

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. Devices that might be used by users in a telecommunications network can include both mobile terminals, such as mobile telephones, personal digital assistants, handheld computers, portable computers, laptop computers, tablet computers and similar devices, and fixed terminals, such as residential gateways, televisions, set-top boxes, and the like. Such mobile and fixed devices will be referred to herein as user equipment or UE.

A group of LTE-based cells might be under the control of a single entity known as a central control. The central control typically manages and coordinates certain activities with a group of cells such as scheduling the transmission of broadcast/multicast services from the ENBs under its control to the UEs being served by the ENBs.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

The transmission of an MBMS can include two components, a multicast control channel (MCCH) and a multicast traffic channel (MTCH). The MTCH delivers the actual content of the MBMS while the MCCH delivers control information related to the MBMS. The MCCH might include key control information that specifies how the content in the MTCH is to be delivered.

An MBMS may be communicated from an ENB to a UE using point-to-point (PTP) communication or point-to-multipoint (PTM) communication. PTP communication is similar to conventional cellular network communication in that there is a dedicated radio bearer between the ENB and a UE. PTP communication from the ENB may enable high quality communication with the UE. However, when an ENB communicates with a large number of UEs using PTP communication, a substantial amount of overhead may be required for establishing and maintaining the PTP communications and a substantial amount of the available spectrum may be occupied.

PTM communication may include utilizing a dedicated channel or dedicated carrier to broadcast data or services to multiple UEs. While a certain amount of overhead may be required to initiate a broadcast PTM communication, the overhead is relatively small and may not vary in relation to the number of UEs. That is, as more UEs utilize the broadcast data or services, the overhead required to establish and maintain the broadcast PTM communication remains approximately the same. Broadcast PTM communications may also improve spectral efficiency as the number of UEs increases because no new transmissions are required for newly added users. In some cases, the quality of broadcast PTM communications may be less than that for PTP communications since there is little or no communication from the UEs to the ENB, and because of power considerations and other factors that may reduce the relative quality of the communication.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. Conversely, destructive interference can occur when different data signals are present in the same region at the same time.

A region in which a plurality of substantially identical signals are present is known as a single frequency network, or SFN. In the case where all of the ENBs in a service area are transmitting an MBMS with substantially identical signals, the service area would be an SFN and augmentation of the signals would occur. However, if the ENBs were transmitting the MBMS with different signals, for example, on a different resource, the service area would not be an SFN and the signals might destructively interfere with one another.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system for providing control channel information is provided. The system comprises a processor programmed to promote transmission of a multicast control channel (MCCH). The MCCH includes information related to a service notifying user equipment when transmission on a resource is blocked by one or more cells within a plurality of cells. The MCCH further includes information notifying user equipment when the service is transmitted at less than full power by one or more of the cells of the plurality of cells.

In another embodiment, a method for providing control information is provided. The method comprises transmitting a multicast control channel (MCCH) including information related to a service. The MCCH includes information related to a service notifying user equipment when transmission on a resource is blocked by one or more cells within a plurality of cells. The MCCH further includes information notifying user equipment when the service is transmitted at less than full power by one or more of the cells of the plurality of cells.

Figure 1:
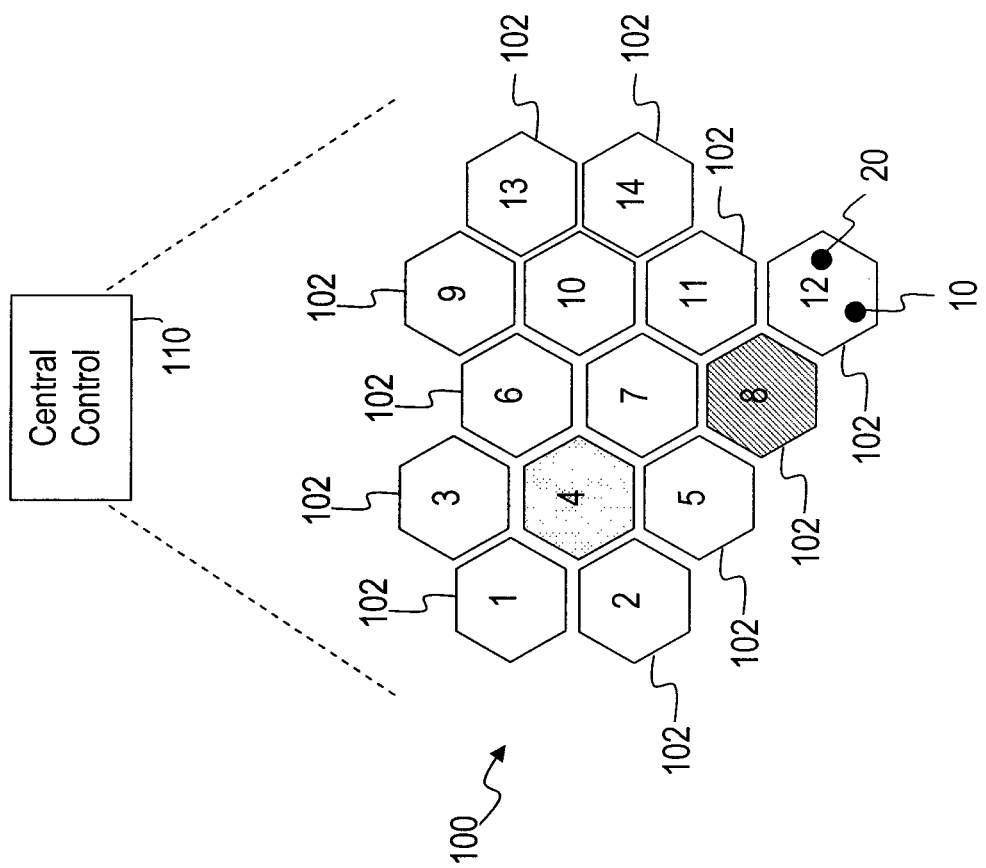
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represent a coverage area for providing cellular services of the cellular network 100 through communication from an enhanced node B (ENB). While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $102_{12}$, it should be understood that an ENB would be present in each of the cells 102. Also, radio links other than the ENBs 20 could be used. A central control 110 or central controller oversees the wireless data transmissions within the cells 102 by providing centralized management and coordination for the cells 102 and their corresponding ENBs 20.

Each of the cells 102 within the cellular network 100 may operate to communicate MBMS services to the UEs 10 in its region of coverage using PTP communication or using PTM communication. In some embodiments, some of the cells 102 may operate to communicate services using only PTP communication and/or some of the cells 102 may operate to communicate services using only PTM communication.

Figure 2:
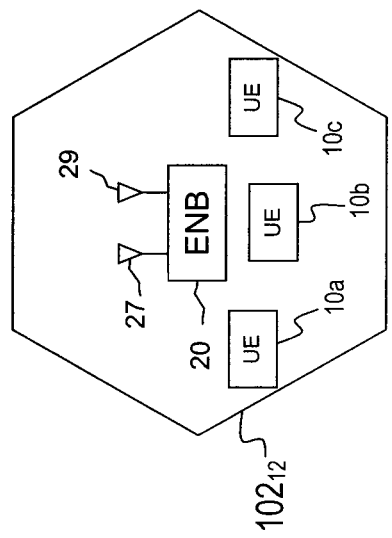
FIG. 2 is an illustration of a cell in a cellular network according to an embodiment of the disclosure.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the other cells 102. A plurality of UEs 10 are present in the cell $102_{12}$, as might be the case in the other cells 102.

As previously discussed, when the same MBMS is broadcast on the same resource, the broadcast PTM communications of the neighboring cells 102 may constructively interfere with each other to increase the quality of the communication observed by the UEs 10 in each of the neighboring cells 102. When different MBMS services are broadcast in neighboring cells 102, the signals carrying the MBMS services may destructively interfere with each other to decrease the quality of the communication in each of the neighboring cells 102. As used herein, the term "neighboring cell" does not necessarily refer only to immediately adjacent cells, but could refer to any cells that are in near enough proximity that a UE in one cell receives signals transmitted by the other cell or cells.

In an embodiment, the central control 110 can optimize or improve the quality of the communications in a service area by selecting different options for the transmission of MBMS signals in the cells 102 in the service area. A first option is for one of the cells 102 that has no UEs 10 interested in an MBMS signal to broadcast the MBMS on the same resource as neighboring cells that do have UEs 10 interested in the MBMS signal. A second option is for one of the cells 102 that has no UEs 10 interested in an MBMS signal to not broadcast an MBMS on the same resource as neighboring cells. A third option is for one of the cells 102 to broadcast an MBMS that is different from an MBMS that is being broadcast by a neighboring cell, but to broadcast the different MBMS at low power.

Under the first option, an improved signal quality can be achieved by having one of the cells 102 broadcast an MBMS that it might otherwise not transmit. This additional MBMS signal can augment the existing signals for that MBMS and thus boost the signal-to-noise ratio for those signals. Under the second option, one of the cells does not transmit an MBMS signal in order to reduce the potential for interference between two other different MBMS signals transmitted by adjacent cells. Under the third option, the reduced power of the MBMS signal in one of the cells 102 can reduce interference with a different MBMS signal in a neighboring cell 102.

Examples of each of these options can be illustrated by referring to FIG. 1. To illustrate the first option, cells $102_6$, $102_7$, $102_9$, $102_{11}$, $102_{13}$, and $102_{14}$ can be assumed to be transmitting the same MBMS signal, which can be referred to as Service X. Cell $102_{10}$, which is surrounded by cells $102_6$, $102_7$, $102_9$, $102_{11}$, $102_{13}$, and $102_{14}$, can be assumed to have no UEs 10 interested in Service X. Cell $102_{10}$, therefore, would typically have no need to transmit Service X. The central control 110, which may be aware of the MBMS services being offered in these cells 102 and of the number of UEs 10 in these cells 102 that are interested in those services, can cause cell $102_{10}$ to transmit Service X even though cell $102_{10}$ contains no UEs 10 interested in Service X. The broadcasting of Service X in cell $102_{10}$ can augment the signal for Service X in cells $102_6$, $102_7$, $102_9$, $102_{11}$, $102_{13}$, and $102_{14}$ and can thus improve the signal-to-noise ratio for the Service X signal in those cells 102.

To illustrate the second option, cell $102_5$ can be assumed to be transmitting Service X on a resource that can be referred to as Resource A. A resource may be a particular modulation and coding scheme, such as of an OFDM (orthogonal frequency division multiplexing) resource. Cell $102_{12}$ might also be transmitting on Resource A, but might be transmitting a different MBMS, which can be referred to as Service Y. Cell $102_8$, which is between cells $102_5$ and $102_{12}$, might not contain any UEs 10 that are interested in receiving Service X or Service Y. If cell $102_8$ were to follow the procedure of the first option and transmit Service X on Resource A in order to boost the signal-to-noise ratio of Service X in cell $102_5$, this transmission might interfere with the transmission of Service Y on Resource A in cell $102_{12}$. On the other hand, if cell $102_8$ were to follow the procedure of the first option and transmit Service Y on Resource A in order to boost the signal-to-noise ratio of Service Y in cell $102_{12}$, this transmission might interfere with the transmission of Service X on Resource A in cell $102_5$. To prevent either of these undesirable outcomes, the central control 110 can specify that neither Service X nor Service Y should be broadcast in cell $102_8$.

To illustrate the third option, cell $102_4$ can be assumed to be transmitting Service X on Resource A. Cells $102_1$, $102_2$, $102_3$, $102_5$, $102_6$, and $102_7$, which surround cell $102_4$, can be assumed to be transmitting Service Y, also on Resource A. If cell $102_4$ were to transmit Service X at full power, this transmission might interfere with the transmission of Service Y in cells $102_1$, $102_2$, $102_3$, $102_5$, $102_6$, and $102_7$. To prevent such interference, the central control 110 can specify that cell $102_4$ should broadcast Service X at a lower power than it would otherwise use.

In an embodiment, the central control 110 can determine which MBMS services are being offered in which of the cells 102 and the number of UEs 10 in the cells 102 that are interested in those services. The central control 110 might then select an appropriate one of the three options, depending upon the circumstances, for each of the cells to optimize the MBMS signals in the neighboring cells 102. That is, the central control 110 can cause the cells 102 to transmit an MBMS at full power, not transmit an MBMS, or transmit an MBMS at low power as appropriate for the selected option.

It is well known in the art that an MBMS signal, such as OFDM symbols, may contain a reference symbol that specifies how the data in the signal should be demodulated/decoded. Upon receiving an MBMS signal, the UEs 10 read the reference symbol to determine how to interpret the signal. This process is known as channel estimation/demodulation. When multiple MBMS services are being transmitted by multiple cells 102, the UEs 10 need to read and properly interpret the reference symbols in all of the MBMS signals that they receive. If all of the cells 102 were transmitting the same content, the UEs 10 would not need to know the transmission status of each of the cells 102 in order to perform channel estimation since the reference symbols for all the MBMS signals would be substantially identical.

However, when MBMS transmissions are blocked in some of the cells 102 or are transmitted at low power in some of the cells 102, the UEs 10 need to be aware of that information in order to correctly perform channel estimation. For example, if one of the UEs 10 assumed it was receiving a full strength signal from one of the cells 102 that was actually transmitting at low power or not transmitting at all, the UE 10 might not decode the reference symbol correctly.

In an embodiment, the central control 110 may promote at least one of the cells 102 informing the UEs 10 under its control of the status of the MBMS transmissions in the neighboring cells 102. The UEs 10 can then use this information to properly perform channel estimation for the MBMS transmissions that they receive. For example, cells $102_5$, $102_7$, $102_{11}$, and $102_{12}$ might be informed that the transmission of an MBMS has been blocked in cell $102_8$. Similarly, cells $102_1$, $102_2$, $102_3$, $102_5$, $102_6$, and $102_7$ might be informed that an MBMS is transmitting at low power in cell $102_4$. In either case, the cells 102 that are not immediately adjacent to cells $102_4$ and $102_8$ might also be informed of the status of the transmissions in those cells 102. The cells 102 can use this information about the status of the transmissions in the neighboring cells 102 to interpret the reference symbols in the MBMS signals that they receive.

In an embodiment, information about the status of transmissions in neighboring cells 102 is provided to the UEs 10 in the MCCH portion of an MBMS signal. That is, when the ENB 20 in one of the cells 102 transmits an MBMS signal, the MCCH portion of the signal can specify whether the neighboring cells 102 are transmitting one or more MBMS signals, blocking one or more MBMS signals, or transmitting one or more MBMS signals at reduced power. More specifically, in the case where an MBMS is being transmitted at low power in one of the cells 102, the MCCH transmitted in neighboring cells 102 might include an identifier for the cell 102 that is transmitting at low power and a power offset, or the amount by which the power has been reduced. In the case where an MBMS is being blocked in one of the cells 102, the MCCH transmitted in neighboring cells 102 might include an identifier for the cell 102 in which the transmission is being blocked. In the case where an MBMS is being transmitted in one of the cells 102 that has no UEs 10 interested in the MBMS, the MCCH transmitted in neighboring cells 102 might include an identifier for the cell 102 that is transmitting the MBMS.

Figure 3:
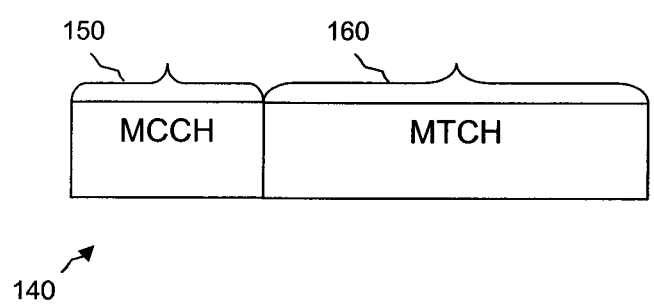
FIG. 3 is a diagram of an MBMS signal according to an embodiment of the disclosure.

FIG. 3 illustrates an embodiment of an MBMS signal 140 containing an MCCH portion 150 and an MTCH portion 160. The MTCH portion 160 contains the actual content associated with the MBMS and the MCCH portion 150 contains control information for the MBMS. The MCCH portion 150 can include identifiers for cells 102 that are transmitting at low power or in which transmission has been blocked. In the case of cells 102 that are transmitting at low power, the MCCH portion 150 can also include the amount by which the power has been reduced.

Figure 4:
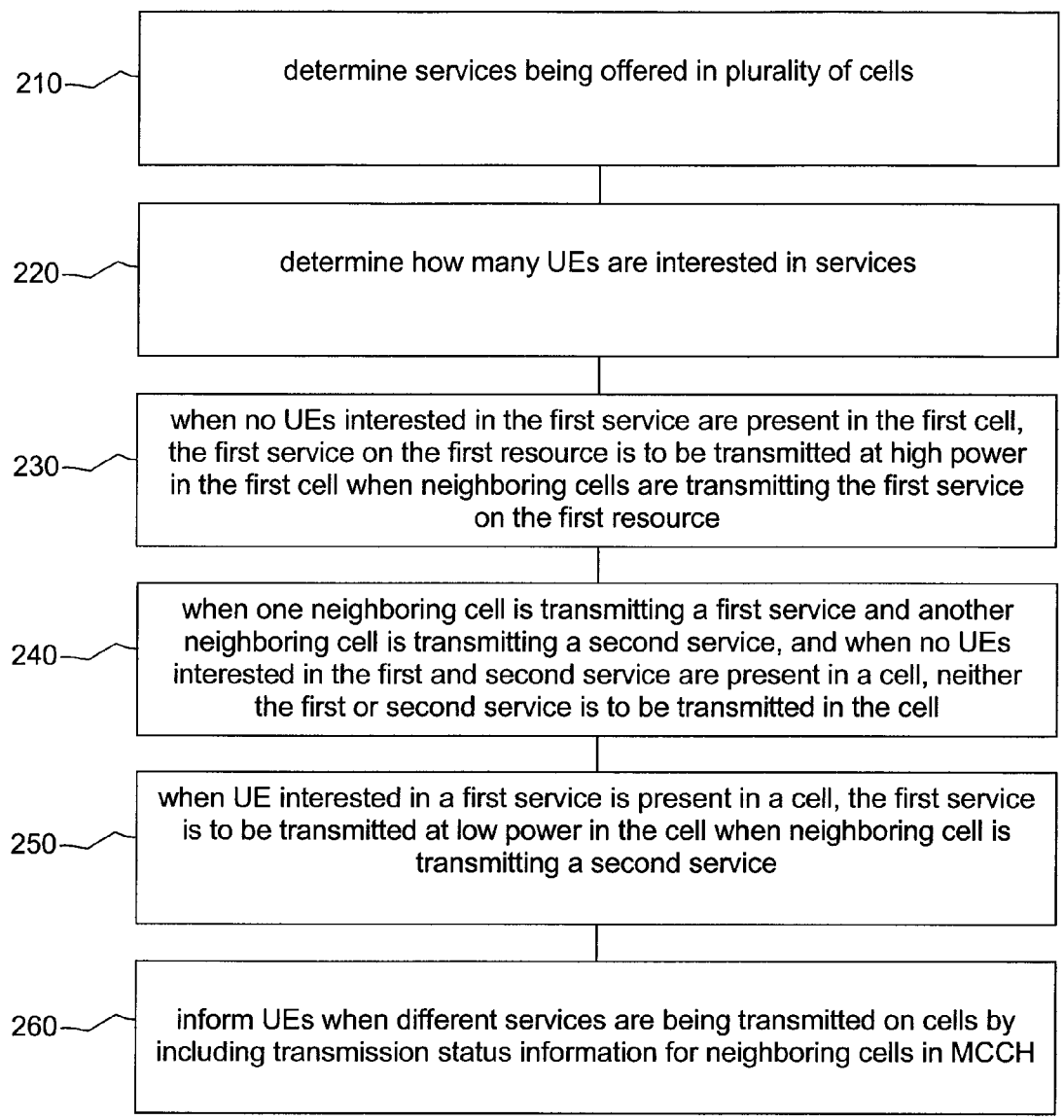
FIG. 4 is a diagram of a method for improving signal quality in a cellular network according to an embodiment of the disclosure.

FIG. 4 illustrates an embodiment of a method 200 for improving signal quality in a cellular network. In block 210, the services that are being offered in a plurality of cell are determined. In block 220, the number of UEs interested in the services is determined. A central control would typically make these determinations for the cells under its control. In block 230, when no UEs interested in a first service are present in a first cell, the first service on a first resource is to be transmitted at high power in the first cell when neighboring cells are transmitting the first service on the first resource. In block 240, when one neighboring cell is transmitting a first service and another neighboring cell is transmitting a second service, and when no UEs interested in the first and second service are present in a cell, neither the first or second service is to be transmitted in the cell. In block 250, when a UE interested in a first service is present in a cell, the first service is to be transmitted at low power on a first resource in the cell when a neighboring cell is transmitting a second service on the first resource. In block 260, the UEs are informed when the first, second, or third service is being transmitted. This transmission status information can be included in the MCCH portion of an MBMS signal.

Figure 5:
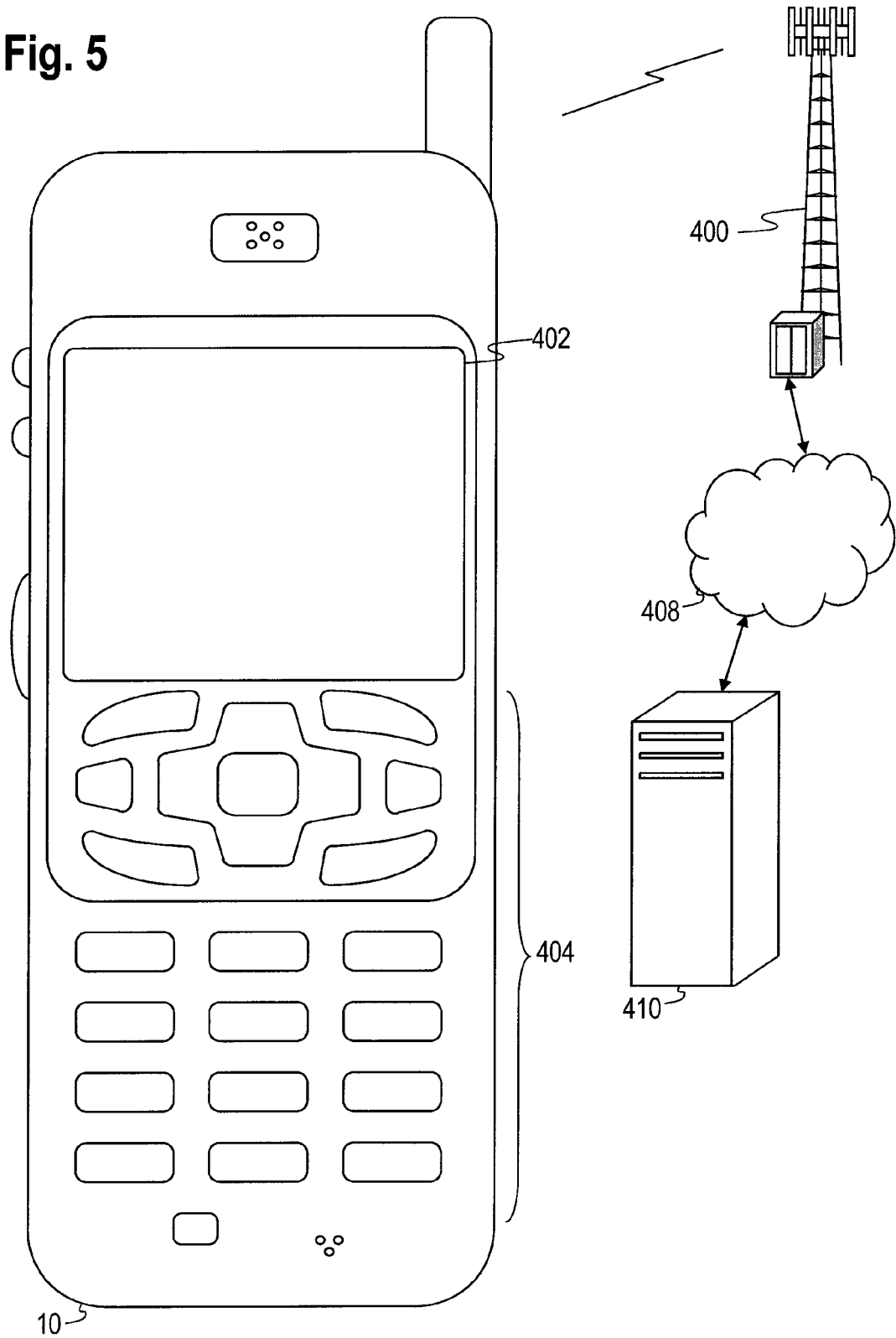
FIG. 5 is a diagram of a wireless communications system including user equipment operable for some of the various embodiments of the disclosure.

FIG. 5 illustrates a wireless communications system including an embodiment of one of the UEs 10. The UE 10 is operable for implementing aspects of the disclosure, but the disclosure should not be limited to these implementations.

Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, wireless handset, pager, or PDA. In another embodiment, the UE 10 may be a portable, laptop or other computing device.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct. The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction.

Among the various applications executable by the UE 10 are a web browser, which enables the display 402 to show a web page. The web page is obtained via wireless communications with a wireless network access node, a cell tower, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402.

Figure 6:
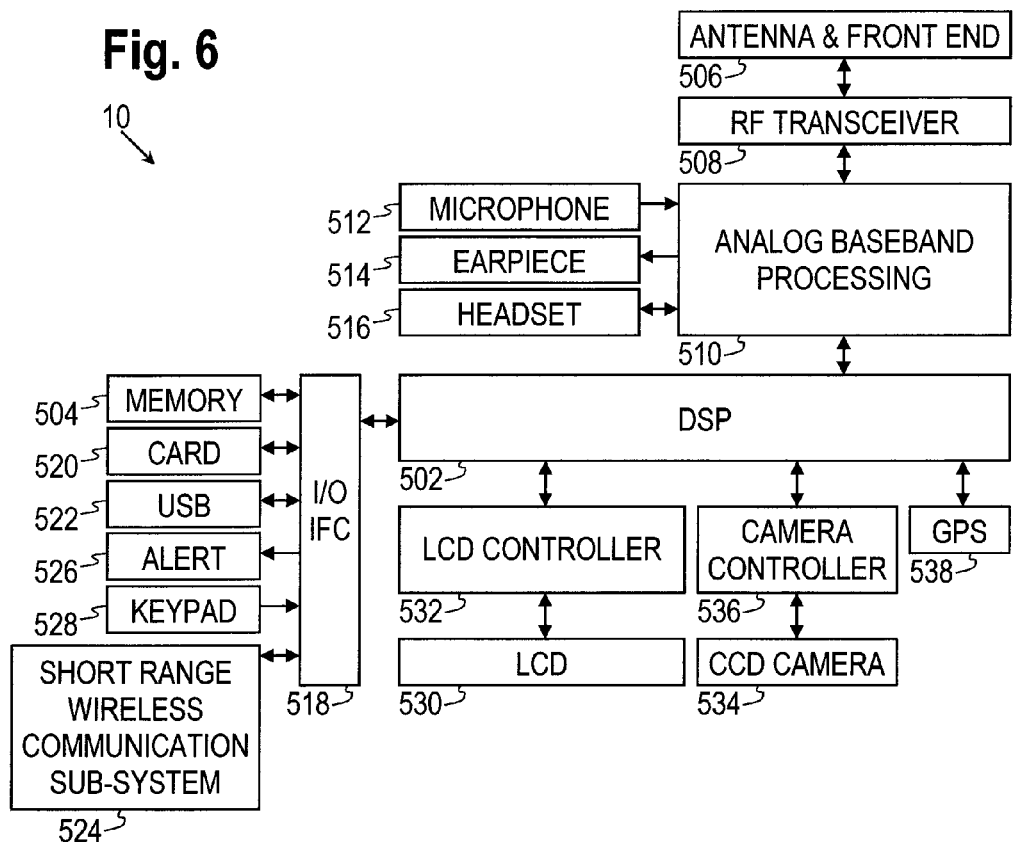
FIG. 6 is a block diagram of user equipment operable for some of the various embodiments of the disclosure.

FIG. 6 shows a block diagram of the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the UE 10 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. The GPS sensor 538 is coupled to the DSP 502 to decode global positioning system signals, thereby enabling the UE 10 to determine its position. Various other peripherals may also be included to provide additional functions, e.g., radio and television reception.

Figure 7:
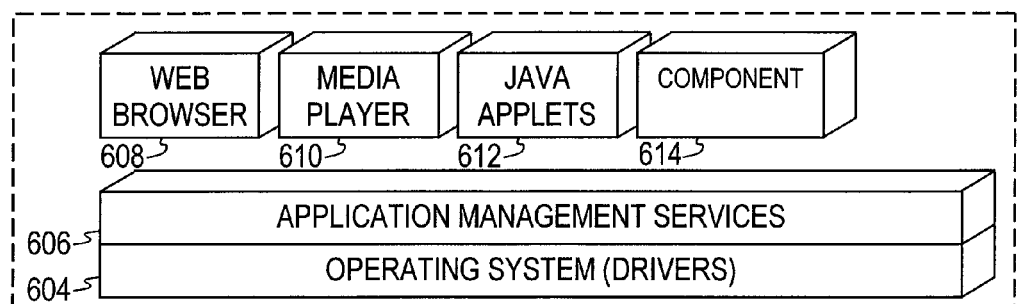
FIG. 7 is a diagram of a software environment that may be implemented on user equipment operable for some of the various embodiments of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 10. Also shown in FIG. 7 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audio-visual media. The Java applets 612 configure the UE 10 to provide games, utilities, and other functionality. A component 614 might provide functionality related to decoding and demodulating signals for MBMS services.

Figure 8:
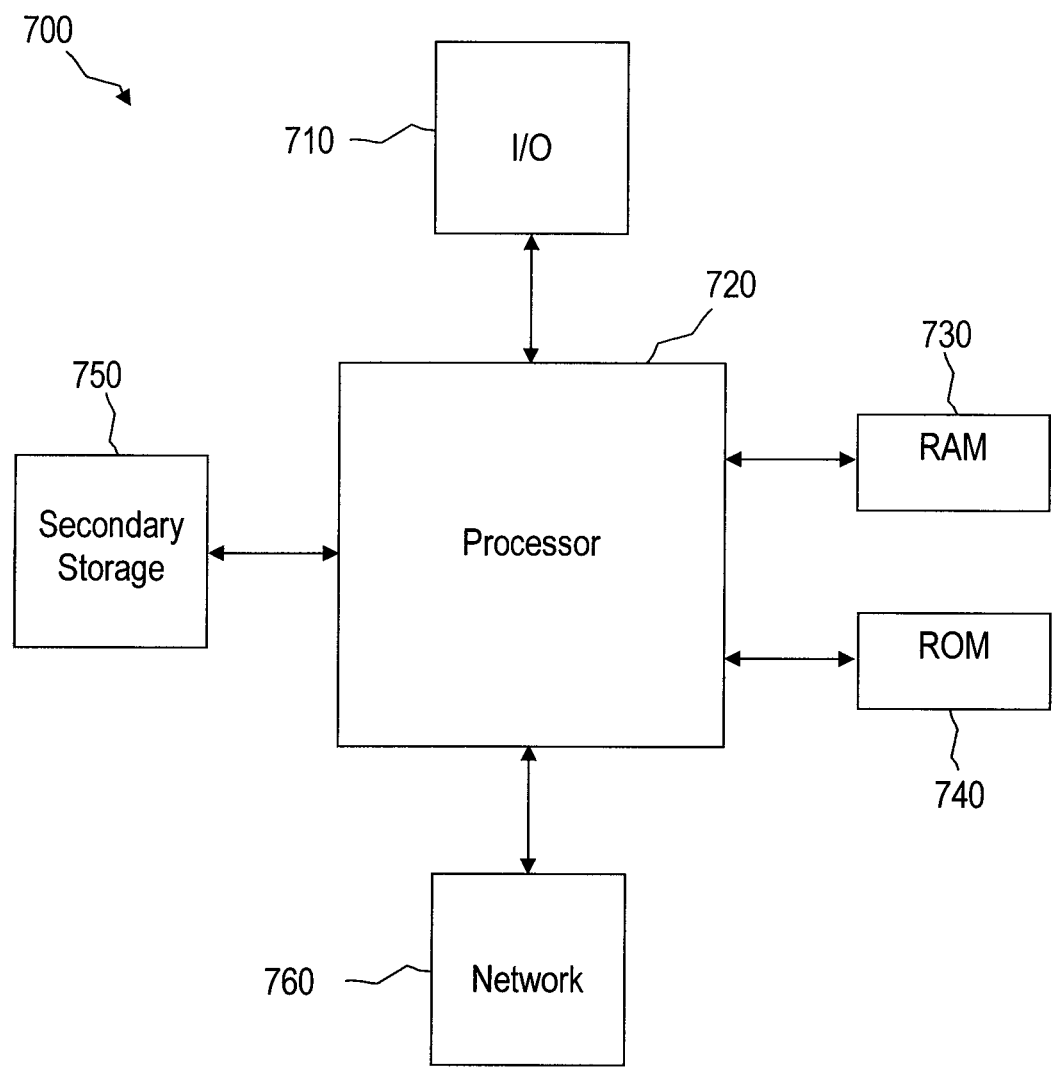
FIG. 8 is an illustrative general purpose computer system suitable for some of the various embodiments of the disclosure.

The ENB 20, the central control 110, and other components that might be associated with the cells 102 may include any general-purpose computer with sufficient processing power, memory resources, and network throughput capability to handle the necessary workload placed upon it. FIG. 8 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for providing control channel information to communicate services to user equipment, comprising:
a processor programmed such that a transmission is made of a multicast control channel (MCCH) including information related to a multimedia broadcast multicast services (MBMS) service, wherein the transmission specifies whether one or more neighboring cells within a plurality of cells are transmitting one or more signals of the MBMS service at reduced power.

2. The system of claim 1, wherein reduced power includes when transmission of the MBMS service on a corresponding resource of the one or more neighboring cells is restricted by a certain power offset.

3. The system of claim 2, wherein the corresponding resource is further defined as an OFDM (orthogonal frequency division multiplexing) resource.

4. The system of claim 2, wherein reduced power includes transmission at a low power.

5. The system of claim 1, further comprising:
user equipment using the MCCH information for signal reception.

6. The system of claim 1, wherein the MCCH further including information notifying user equipment when transmission on a resource is promoted by one or more neighboring cells within the plurality of cells.

7. The system of claim 1, wherein the MCCH further includes a cell identification of those cells that the transmission on a resource is blocked by one or more cells within the plurality of cells.

8. The system of claim 1, wherein the MCCH further includes a cell identification of those neighboring cells that a transmission power on a corresponding resource is reduced including a power offset information.

9. The system of claim 1, wherein the MCCH further includes information notifying user equipment when transmission of the MBMS service on a corresponding resource is blocked by the one or more cells.

10. The system of claim 9, wherein blocking includes where a cell does not transmit the MBMS service on the corresponding resource.

11. The system of claim 1, wherein the processor is a processor of an enhanced node B of a cell of the plurality of cells of a telecommunications network, and wherein the system further includes:
a central control of the telecommunications network where a first cell of the plurality of cells transmits a first service on a first resource, a neighboring second cell has no user equipment interested in the first service, the central control configured such that the processor of the enhanced node B promotes transmission of the MCCH including information related to the MBMS service notifying user equipment in the telecommunications network that the transmission was blocked in the neighboring second cell.

12. The system of claim 1, wherein the processor is a processor of an enhanced node B of a cell of the plurality of cells of a telecommunications network, and wherein the system further includes:
a central control of the telecommunications network, the central control configured such that the processor of the enhanced node B promotes transmission of the MCCH including information notifying user equipment that the MBMS service is transmitted at less than full power by one of the cells of the telecommunications network.

13. The system of claim 1, wherein the MCCH further includes information specifying whether the one or more neighboring cells are transmitting signals at full power, reduced power, or no power.

14. A method for providing control information, comprising:
transmitting, by a device, a multicast control channel (MCCH) comprising information notifying user equipment when one or more neighboring cells are transmitting signals related to a multimedia broadcast multicast services (MBMS) service at reduced power.

15. The method of claim 14, wherein the MCCH further comprises information notifying user equipment when transmission on a resource is promoted by the one or more neighboring cells.

16. The method of claim 15, wherein the resource is further defined as an OFDM (orthogonal frequency division multiplexing) resource.

17. The method of claim 14, further comprising:
user equipment using the MCCH information for signal reception.

18. The method of claim 14, wherein the MCCH further includes a cell identification of those cells that transmission on a resource is blocked by the one or more neighboring cells.

19. The method of claim 14, wherein the MCCH further includes a cell identification of those cells that a transmission power on a resource is reduced and a power offset information related to the transmission power reduction.

20. The method of claim 14, wherein transmitting at reduced power prevents signal overlap on a resource between the neighboring cells.

21. The method of claim 14 further comprising transmitting different services on a resource in the neighboring cells.

22. The method of claim 21 wherein a LTE device does not transmit on the resource.

23. The method of claim 14 further comprising:
transmitting a first service on a first resource by a LTE device;
identifying that no user equipment interested in the first service is present in a neighboring cell;
notifying the LTE device by a central control that the first resource is blocked in the neighboring cell.

24. The method of claim 14 further comprising:
transmitting a first service on a first resource by a LTE device;
notifying the LTE device by a central control that a second service is transmitted on the first resource at reduced power in a neighboring cell.

25. The system of claim 14, wherein the MCCH further comprises information specifying an amount by which power is reduced.

26. A system for providing control channel information, comprising:
a processor programmed to promote transmission of a multicast control channel (MCCH) including information related to a service notifying user equipment when transmission on a resource is blocked by one or more cells within a plurality of cells, the MCCH further including information notifying user equipment when the service is transmitted at less than full power by one or more of the cells of the plurality of cells, wherein the processor is a processor of an enhanced node B of a cell of the plurality of cells of a telecommunications network, and
a central control of the telecommunications network where a first cell of the plurality of cells transmits a first service on a first resource, a neighboring second cell has no user equipment interested in the first service, the central control configured such that the processor of the enhanced node B promotes transmission of the MCCH including the information related to the service notifying user equipment in the telecommunications network that the transmission was blocked in the second cell.

* * * * *